United States Patent
Fujimoto

(10) Patent No.: US 7,320,522 B2
(45) Date of Patent: Jan. 22, 2008

(54) DATA PROCESSING APPARATUS AND METHOD AND ENCODING DEVICE OF SAME

(75) Inventor: Yuji Fujimoto, Kanagawa (JP)

(73) Assignee: Sony Corporatin, Tokyo (JP)

( * ) Notice: Subject to any disclaimer, the term of this patent is extended or adjusted under 35 U.S.C. 154(b) by 252 days.

(21) Appl. No.: 11/015,505

(22) Filed: Dec. 16, 2004

(65) Prior Publication Data

US 2005/0166054 A1 Jul. 28, 2005

(30) Foreign Application Priority Data

Dec. 17, 2003 (JP) .............................. 2003-419699

(51) Int. Cl.
- H04B 1/66 (2006.01)
- H04N 7/12 (2006.01)
- H04N 11/04 (2006.01)
- G06K 9/36 (2006.01)
- G06K 9/46 (2006.01)

(52) U.S. Cl. .......................... 353/30; 353/69; 353/121; 353/122; 382/232; 382/307; 375/240.08; 375/240.16

(58) Field of Classification Search .................. 353/30, 353/121, 122, 69; 382/232, 307; 375/240.08, 375/240.16
See application file for complete search history.

(56) References Cited

U.S. PATENT DOCUMENTS 5,699,460 A * 12/1997 Kopet et al. ................. 382/307
6,304,602 B1 * 10/2001 Yokoyama ............. 375/240.08
6,996,176 B1 * 2/2006 Chang et al. .......... 375/240.16

* cited by examiner

*Primary Examiner*—Melissa Jan Koval
(74) *Attorney, Agent, or Firm*—Finnegan, Henderson, Farabow, Garrett & Dunner, L.L.P.

(57) ABSTRACT

A data processing apparatus able to generate a motion vector using projection image data in a short time, wherein an access circuit stores vertical projection image data and horizontal projection image data of each macro block of frame data and reference image data at continuous addresses in a frame memory, whereby they are read at a high speed and output to a projection index data generation circuit.

10 Claims, 14 Drawing Sheets

MB

MB

DATA PROCESSING APPARATUS AND METHOD AND ENCODING DEVICE OF SAME

BACKGROUND OF THE INVENTION

1. Field of the Invention

The present invention relates to a data processing apparatus for motion compensation of moving picture image data and a method and encoding device of the same.

2. Description of the Related Art

In recent years, apparatuses based on the MPEG (Moving Picture Experts Group) and other schemes handling image data digitally and at that time compressing the data by an orthogonal transform such as a discrete cosine transform and motion compensation utilizing the redundancy inherent to image information for the purpose of high efficiency transmission and storage of information have been spreading in use both for broadcasting of information by broadcast stations etc. and for the reception of information at general homes.

As a followup to the MPEG scheme, the encoding scheme referred to as the "JVT" (Joint Video Team) for realizing a further higher compression rate has been proposed.

In the JVT scheme, in the same way as the MPEG, in motion prediction and compensation processing, the motion prediction and compensation are carried out based on a motion vector.

In an encoding device of the JVT scheme, for example the motion prediction and compensation processing uses macro blocks MB as units, specifies the macro block MB minimizing the index data COST indicating a sum of differences among corresponding pixel data between frame data covered by the motion compensation and reference image data thereof in the reference image data, and generates a motion vector in accordance with its position.

Such an encoding device cumulatively adds, for each of the frame data covered by the motion compensation and the reference image data thereof, pixel data having the same pixel position in the row direction (vertical direction) in macro blocks in units of macro blocks so as to generate horizontal projection image data and cumulatively adds pixel data having the same pixel position in the column direction (horizontal direction) so as to generate vertical projection image data.

The encoding device generates projection index data PJ_COST indicating the difference based on the horizontal projection image data and vertical projection image data between the macro blocks of the frame data covered by the motion compensation and the macro blocks of the reference image data.

The encoding device specifies the macro block MB minimizing the projection index data PJ_COST among the plurality of macro blocks in the reference image data and generates a motion vector based on its position.

A conventional encoding device sequentially writes for example the vertical projection image data of the macro blocks MB at continuous addresses (addresses in the horizontal direction) in a memory and sequentially writes the horizontal projection image data at noncontinuous addresses (addresses in the vertical direction) in the memory.

Summarizing the problem to be solved by the invention, in such a conventional encoding device, since the horizontal projection image data of the macro blocks are sequentially written at a sequence of noncontinuous addresses in the memory, there are the problems that a long time is taken for reading the data, pipeline processing cannot be efficiently carried out, and the processing time becomes long.

Further, in the conventional encoding device, the motion vector is searched for based on the macro blocks MB in a search range defined around a predetermined search base point in the reference image data. In this search operation, for example, intervals of search positions are made the same in the entire search range. Shortening of the processing time of the search operation is therefore demanded.

Further, in the conventional encoding device, in the search for a motion vector using a projection image, there is the problem that for example a correct motion vector MV cannot be generated for macro blocks MB having different image patterns but the same index data PJ_COST by the projection image.

SUMMARY OF THE INVENTION

An object of the present invention is to provide a data processing apparatus able to generate a motion vector using projection image data in a short time and a method and an encoding device of the same.

Another object of the present invention is to provide a data processing apparatus able to correctly generate a motion vector even in a case using projection image data and a method and an encoding device of the same.

In order to achieve the above objects, according to a first aspect of the invention, there is provided a data processing apparatus comprising a projection image generating means for generating first horizontal projection image data and first vertical projection image data of first block data in encoded image data and generating second horizontal projection image data and second vertical projection image data for each of a plurality of second block data in reference image data; a controlling means for writing each of the first vertical projection image data, the first horizontal projection image data, the second vertical projection image data, and the second horizontal projection image data generated by the projection image generating means at continuous addresses of a storing means and reading the same from the continuous addresses of the storing means; and a searching means for specifying second block data having a minimum difference from the first block data among the plurality of block data and generating a motion vector based on the first vertical projection image data, the first horizontal projection image data, the second vertical projection image data, and the second horizontal projection image data read by the controlling means.

The mode of operation of the data processing apparatus of the first aspect of the invention is as follows. First, the projection image generating means generates first horizontal projection image data and first vertical projection image data of first block data in encoded image data and generates second horizontal projection image data and second vertical projection image data for each of a plurality of second block data in reference image data. Next, the controlling means writes the first vertical projection image data, the first horizontal projection image data, the second vertical projection image data, and the second horizontal projection image data generated by the projection image generating means at continuous addresses of a storing means. Next, the controlling means reads the data from the continuous addresses of the storing means. Next, the searching means specifies the second block data having the minimum difference from the first block data among the plurality of block data and generates a motion vector based on the first vertical projection image data, the first horizontal projection image data, the second vertical projection image data, and the second horizontal projection image data read by the controlling means.

According to a second aspect of the invention, there is provided an encoding device having a motion compensation circuit for generating a motion vector of block data composing encoded image data and generating predicted image data in accordance with the motion vector and an encoding circuit for encoding the difference between the encoded image data and the predicted image data generated by the motion compensation circuit, wherein the motion compensation circuit has a projection image generating means for generating first horizontal projection image data and first vertical projection image data of first block data in the encoded image data and generating second horizontal projection image data and second vertical projection image data for each of plurality of second block data in reference image data, a controlling means for writing each of the first vertical projection image data, the first horizontal projection image data, the second vertical projection image data, and the second horizontal projection image data generated by the projection image generating means at continuous addresses of a storing means and reading the same from the continuous addresses of the storing means, a motion vector generation circuit for specifying second block data having the minimum difference from the first block data among the plurality of second block data and generating a motion vector based on the first vertical projection image data, the first horizontal projection image data, the second vertical projection image data, and the second horizontal projection image data read by the controlling means, and a processing means for generating the predicted image data based on the motion vector generated by the motion vector generating means.

The mode of operation of the encoding device of the second aspect of the invention is as follows. The motion compensation circuit generates a motion vector of the block data composing encoded image data by the same function as that of the data processing apparatus of the first aspect of the invention. Then, the motion compensation circuit generates predicted image data in accordance with the motion vector. Next, the encoding circuit encodes the difference between the encoded image data and the predicted image data generated by the motion compensation circuit.

According to a third aspect of the invention, there is provided a data processing method comprising a first step of generating first horizontal projection image data and first vertical projection image data of first block data in encoded image data and generating second horizontal projection image data and second vertical projection image data for each of plurality of second block data in reference image data, a second step of writing each of the first vertical projection image data, the first horizontal projection image data, the second vertical projection image data, and the second horizontal projection image data generated in the first step at continuous addresses of a storing means, a third step of reading the first vertical projection image data, the first horizontal projection image data, the second vertical projection image data, and the second horizontal projection image data written at the continuous addresses of the storing means in the second step from the storing means; and a fourth step of specifying the second block data having the minimum difference from the first block data among the plurality of second block data and generating a motion vector based on the first vertical projection image data, the first horizontal projection image data, the second vertical projection image data, and the second horizontal projection image data read in the third step.

According to a fourth aspect of the invention, there is provided a data processing apparatus comprising a detection circuit for detecting the difference between the block data of a designated search position among a plurality of block data at different search positions in a search range prescribed using a predetermined search base point of the reference image data as a standard and block data in encoded image data; a motion vector generation circuit for specifying the block data in the reference image data having the minimum difference detected by the detection circuit and generating a motion vector; and a designation circuit for sequentially designating the search position of the block data in the reference image data to the detection circuit from a start point along a spiral pattern using the search base point as the start point, designating to the detection circuit the position by a first distance interval when the designated search position is within a predetermined distance from the search base point, and designating the search position by a second distance interval longer than the first distance interval when it is not within the predetermined distance.

The mode of operation of the data processing apparatus of the fourth aspect of the invention is as follows. The detection circuit detects the difference between the block data at the search position designated by the designation circuit among the plurality of block data at different search positions within the search range designated using the predetermined search base point of the reference image data as a standard and block data in encoded image data. Next, the motion vector generation circuit specifies the block data in the reference image data having the minimum difference detected by the detection circuit and generates a motion vector. Further, the designation circuit sequentially designates the search position of the block data in the reference image data to the detection circuit from a start point along a spiral pattern using a search base point as a start point, designates to the detection circuit the position by a first distance interval when the designated search position is within a predetermined distance from the search base point, and designates the search position by a second distance interval longer than the first distance interval when it is not within the predetermined distance.

According to a fifth aspect of the invention, there is provided an encoding device having a motion compensation circuit for generating a motion vector of block data composing encoded image data and generating predicted image data in accordance with the motion vector and an encoding circuit for encoding the difference between the encoded image data and predicted image data generated by the motion compensation circuit, wherein the motion compensation circuit has a detection circuit for detecting the difference between the block data of a designated search position among a plurality of block data at different search positions in a search range prescribed using a predetermined search base point of the reference image data as a standard and block data in the encoded image data, a motion vector generation circuit for specifying the block data in the reference image data having the minimum difference detected by the detection circuit and generating a motion vector, and a designation circuit for sequentially designating the search position of the block data in the reference image data to the detection circuit from a start point along a spiral pattern using the search base point as the start point, designating to the detection circuit the position by a first distance interval when the designated search position is within a predetermined distance from the search base point, and designating the search position by a second distance interval longer than the first distance interval when it is not within the predetermined distance.

The mode of operation of the encoding device of the fifth aspect of the invention is as follows. The motion compensation circuit generates a motion vector of block data composing encoded image data by the same function as that of the data processing apparatus of the fourth aspect of the invention. Then, the motion compensation circuit generates predicted image data in accordance with the motion vector. Next, the encoding circuit encodes the difference between the encoded image data and the predicted image data generated by the motion compensation circuit.

According to a sixth aspect of the invention, there is provided a data processing method comprising a first step of sequentially designating the search position of block data in reference image data from a start point along a spiral pattern using a search base point in reference image data as a start point, designating the position by a first distance interval when the designated search position is within a predetermined distance from the search base point, and designating the search position by a second distance interval longer than the first distance interval when it is not within the predetermined distance; a second step of detecting the difference between the block data at the search position designated in the first step among the plurality of block data at the different search positions in a search range prescribed using the search base point of the reference image data as a standard and block data in the encoded image data; and a third step of specifying the block data in the reference image data having the minimum difference detected in the second step and generating a motion vector.

According to a seventh aspect of the invention, there is provided a data processing apparatus comprising a candidate motion vector specifying circuit for detecting a difference between projection image data of first block data in encoded image data and each of the projection image data of a plurality of second block data in the reference image data and specifying a plurality of candidate motion vectors corresponding to a predetermined plurality of differences from a smallest difference among the detected plurality of differences; an index data calculation circuit for calculating index data indicating a sum of differences among corresponding pixel data between the first block data and the second block data corresponding to the candidate motion vector for each of the plurality of candidate motion vectors specified by the candidate motion vector specifying circuit; and a motion vector specifying circuit for specifying the candidate motion vector corresponding to the minimum index data among the index data calculated by the index data calculation circuit as the motion vector of the first block data.

The mode of operation of the data processing apparatus of the seventh aspect of the invention is as follows. The candidate motion vector specifying circuit detects a difference between projection image data of first block data in encoded image data and each of the projection image data of a plurality of second block data in the reference image data and specifies a plurality of candidate motion vectors corresponding to a predetermined number of differences from the minimum difference among the detected plurality of differences. Next, the index data calculation circuit calculates index data indicating the sum of the differences among the corresponding pixel data between the first block data and the second block data corresponding to the candidate motion vector for each of the plurality of candidate motion vectors specified by the candidate motion vector specifying circuit. Next, the motion vector specifying circuit specifies the candidate motion vector corresponding to the minimum index data among the index data calculated by the index data calculation circuit as the motion vector of the first block data.

According to an eighth aspect of the invention, there is provided an encoding device having a motion compensation circuit for generating a motion vector of block data composing encoded image data and generating predicted image data in accordance with the motion vector and an encoding circuit for encoding the difference between the encoded image data and predicted image data generated by the motion compensation circuit, wherein the motion compensation circuit has a candidate motion vector specifying circuit for detecting the difference between the projection image data of first block data in the encoded image data and each of the projection image data of a plurality of second block data in the reference image data and specifying a plurality of candidate motion vectors corresponding to a predetermined number differences from the smallest difference among the detected plurality of differences, an index data calculation circuit for calculating index data indicating a sum of differences among corresponding pixel data between the first block data and the second block data corresponding to the candidate motion vector for each of the plurality of candidate motion vectors specified by the candidate motion vector specifying circuit, and a motion vector specifying circuit for specifying the candidate motion vector corresponding to the minimum index data among the index data calculated by the index data calculation circuit as the motion vector of the first block data.

The mode of operation of the encoding device of the eighth aspect of the invention is as follows. The motion compensation circuit generates a motion vector of block data composing encoded image data by the same function as that of the data processing apparatus of the seventh aspect of the invention. Then, the motion compensation circuit generates predicted image data in accordance with the motion vector. Next, the encoding circuit encodes the difference between the encoded image data and the predicted image data generated by the motion compensation circuit.

According to a ninth aspect of the invention, there is provided a data processing method comprising a first step of detecting a difference between projection image data of first block data in encoded image data and each of the projection image data of a plurality of second block data in reference image data and specifying a plurality of candidate motion vectors corresponding to a predetermined number of differences from the minimum difference among the detected plurality of differences; a second step of calculating index data indicating the sum of differences among corresponding pixel data between the first block data and the second block data corresponding to the candidate motion vector for each of the plurality of candidate motion vectors specified in the first step; and a third step of specifying the candidate motion vector corresponding to the minimum index data among the index data calculated in the second step as the motion vector of the first block data.

According to the first to third aspects of the invention, a data processing apparatus able to generate a motion vector using projection image data in a short time and a method and encoding device of the same can be provided. According to the fourth to sixth aspects of the invention, a data processing apparatus able to generate a motion vector in a short time and a method and encoding device of the same can be provided. According to the seventh to ninth aspects of the invention, a data processing apparatus able to correctly generate a motion vector even in the case where projection image data is used and a method and encoding device of the same can be provided.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Figure 1:
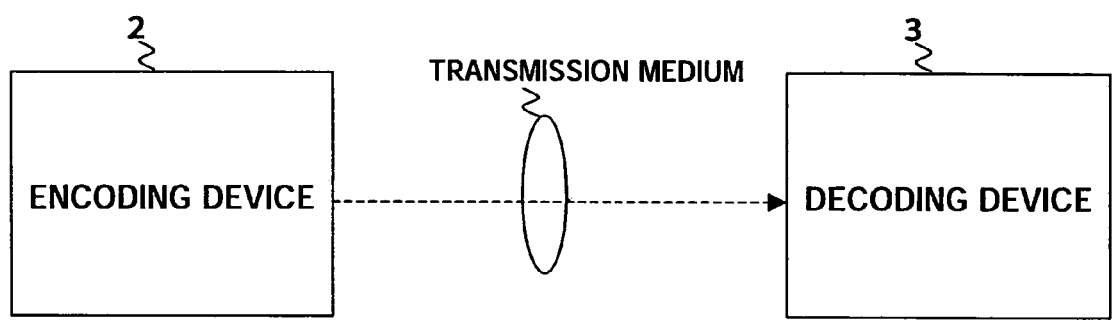
FIG. 1 is a view of the configuration of a communication system of a first embodiment of the present invention.

Below, an explanation will be given of an encoding device of the JVT scheme according to embodiments of the present invention.

First Embodiment

Below, an explanation will be given of an embodiment of the present invention by referring to FIG. 1 to FIG. 13. First, an explanation will be given of correspondence of components between the present invention and the present embodiment. The present embodiment is an embodiment corresponding to the first to third aspects of the invention. The motion prediction and compensation circuits 39 shown in FIG. 2 and FIG. 4 correspond to the data processing apparatus of the first aspect of the invention and the motion compensation circuit of the second aspect of the invention. Further, a frame memory 37 shown in FIG. 2 corresponds to the storing means of the first to third aspects of the invention. Further, a projection image generation circuit 50 shown in FIG. 4 corresponds to the projection image generating means of the first and second aspects of the invention, an access circuit 51 corresponds to the controlling means of the first and second aspects of the invention, and a projection index data generation circuit 52 and an MV search circuit 53 correspond to the searching means of the first and second aspects of the invention.

Below, a detailed explanation will be given of a communication system 1 of the first embodiment. FIG. 1 is a conceptual view of the communication system 1 of the present embodiment. As shown in FIG. 1, the communication system 1 has an encoding device 2 provided on a transmission side and a decoding device 3 provided on a reception side. In the communication system 1, the encoding device 2 on the transmission side generates frame image data (bit stream) compressed by an orthogonal transform such as a discrete cosine transform or a Karhunen-Loeve transform and motion compensation, modulates the frame image data, then transmits the same via a transmission medium such as a satellite broadcast, cable TV network, telephone line network, or mobile phone network. The reception side demodulates the received image signal, then expands the data by an inverse transform to the orthogonal transform at the time of the modulation and the motion compensation to generate the frame image data for use. Note that the transmission media may also be a storage medium such as an optical disk, magnetic disk, or semiconductor memory. The decoding device 3 shown in FIG. 1 performs decoding corresponding to the encoding of the encoding device 2.

Figure 2:
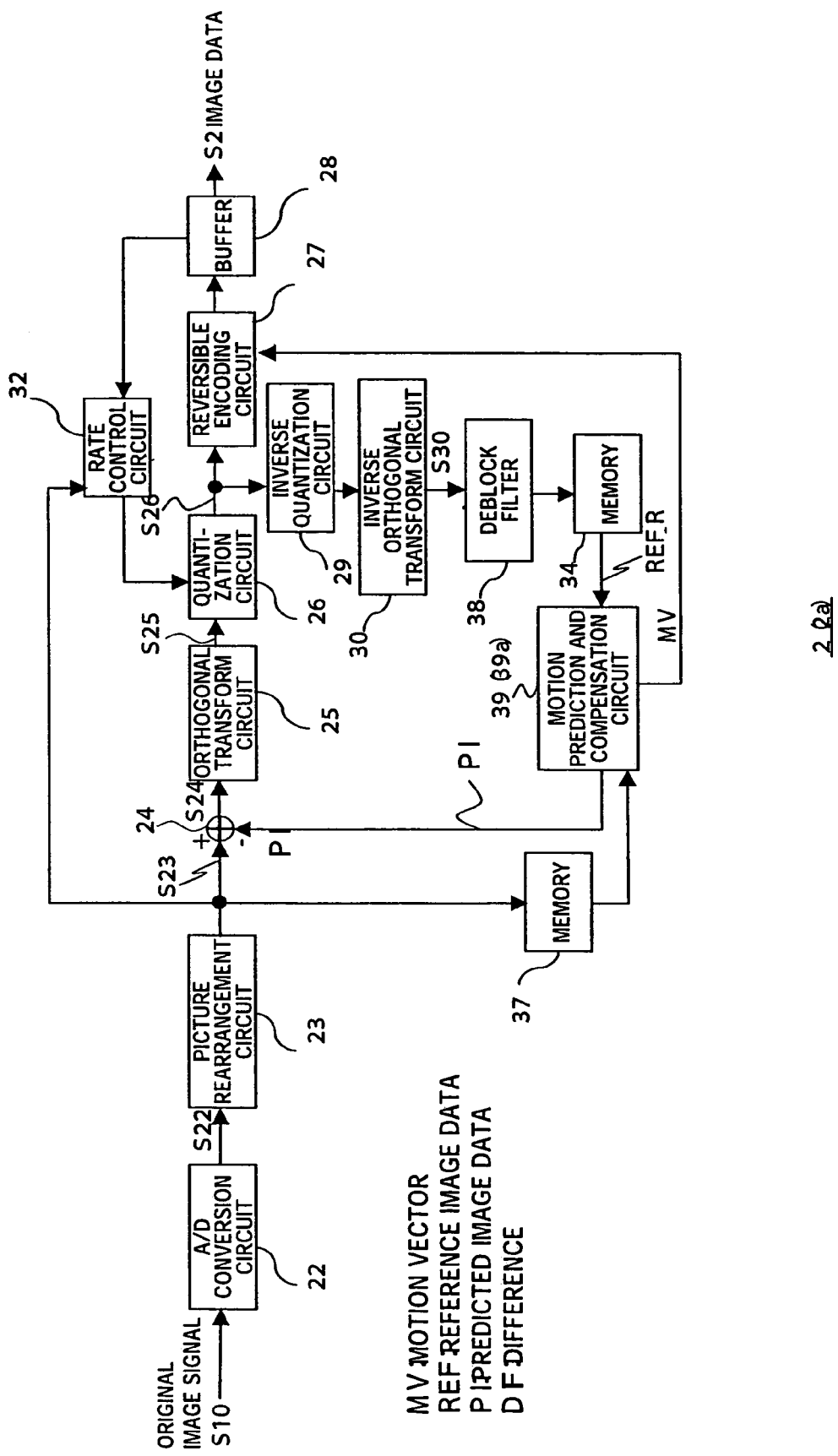
FIG. 2 is a functional block diagram of an encoding device shown in FIG. 1.

Below, an explanation will be given of the encoding device 2 shown in FIG. 1. FIG. 2 is a view of the overall configuration of the encoding device 2 shown in FIG. 1. As shown in FIG. 2, the encoding device 2 has for example an A/D conversion circuit 22, a picture rearrangement circuit 23, a computation circuit 24, an orthogonal transform circuit 25, a quantization circuit 26, a reversible encoding circuit 27, a buffer 28, an inverse quantization circuit 29, an inverse orthogonal transform circuit 30, a rate control circuit 32, a frame memory 34, a frame memory 37, a deblock filter 38, and a motion prediction and compensation circuit 39.

Below, an explanation will be given of components of the encoding device 2. The A/D conversion circuit 22 converts an original image signal S10 comprised of an input analog luminance signal Y and color difference signals Cb and Cr to digital frame data S22 and outputs this to the picture rearrangement circuit 23. The picture rearrangement circuit 23 rearranges the frame data S22 input from the A/D conversion circuit 22 to a sequence for encoding in accordance with a GOP (Group Of Pictures) structure comprised of their picture types I, P, and B and outputs the thus rearranged frame data S23 to the computation circuit 24 and the rate control circuit 32. Further, the picture rearrangement circuit 23 writes the frame data S23 for processing into the frame memory 37. Further, the frame data S23 stored in the frame memory 37 becomes the reference image data REF in a case where it is referred to from the other image data in the motion prediction and compensation circuit 39.

The computation circuit 24 generates image data S24 indicating the difference between a motion compensation block MCB for processing in the frame data S23 and a motion compensation block MCB of predicted image data PI input from the motion prediction and compensation circuit 39 corresponding to that and outputs this to the orthogonal transform circuit 25. The orthogonal transform circuit 25 applies an orthogonal transform such as a discrete cosine transform or Karhunen-Loeve transform to the image data S24 to generate the image data (for example DCT coefficient) S25 and outputs this to the quantization circuit 26. The quantization circuit 26 quantizes the image data S25 with the quantization scale input from the rate control circuit 32 to generate image data S26 and outputs this to the reversible encoding circuit 27 and the inverse quantization circuit 29.

The reversible encoding circuit 27 stores the image data obtained by variable length encoding or arithmetic encoding of the image data S26 in the buffer 28. At this time, the reversible encoding circuit 27 encodes the motion vector MV input from the motion prediction and compensation circuit 39 and stores this in the header data when performing inter-prediction encoding.

The image data stored in the buffer 28 is modulated, then transmitted. The inverse quantization circuit 29 generates a signal inversely quantized from the image data S26 and outputs this to the inverse orthogonal transform circuit 30. The inverse orthogonal transform circuit 30 applies an inverse transform to the orthogonal transform in the orthogonal transform circuit 25 to the image data input from the inverse quantization circuit 29 and outputs the image data to the deblock filter 38.

The deblock filter 38 strips block distortion from the image data input from the inverse orthogonal transform circuit 30 to writes the thus generated image data S30 into the frame memory 34.

The rate control circuit 32 generates a quantization parameter QP so that for example a portion having a high degree of complexity in the image is finely quantized and a portion having a low degree of complexity in the image is roughly quantized based on the frame data S23 input from the picture rearrangement circuit 23. Then, the rate control circuit 32 generates a quantization scale based on the generated quantization parameter QP and the image data read from the buffer 23 and outputs this to the quantization circuit 26.

The motion prediction and compensation circuit 39 performs motion prediction and compensation processing by the projection image in units of macro blocks MB based on the frame data S23 and the reference image data REF read from the frame memory 37 to calculate a motion vector MV_P.

Figure 3:
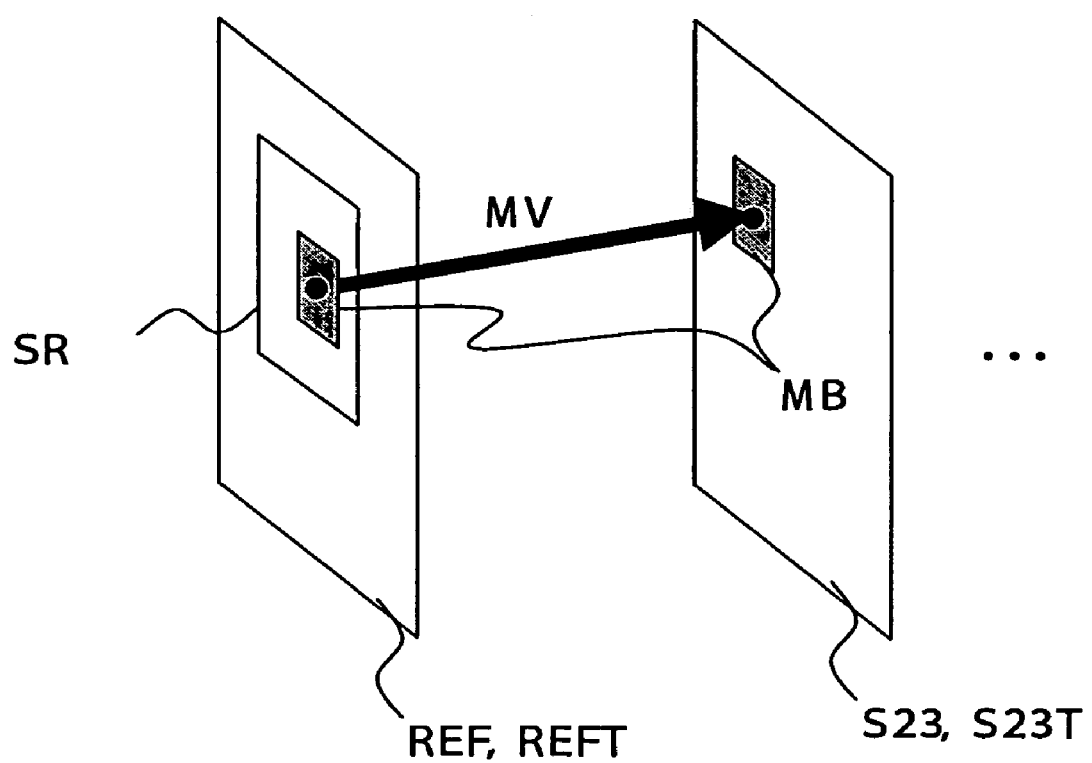
FIG. 3 is a view for explaining a search method of a motion vector in a motion prediction and compensation circuit shown in FIG. 2.

Namely, the motion prediction and compensation circuit 39 specifies the position of the macro block MB having the smallest difference (the second block data of the present invention) from the macro block MB for processing in the frame data S23 (the first block data of the present invention) within the search range SR of the reference image data REF and calculates the motion vector MV_P corresponding to these position relationships. At this time, the motion prediction and compensation circuit 39 detects projection index data PJ_COST indicating the difference between the macro block MB for processing in the frame data S23 and the macro block MB in the reference image data REF by using the projection image data of these macro blocks MB. The motion prediction and compensation circuit 39 determines the search range SR in the recomposed reference image data REF_R read from the frame memory 34 based on the motion vector MV_P generated based on the projection image data as shown in FIG. 3, specifies the macro block MB having the minimum sum of differences for each pixel data with the macro block MB for processing in the determined search range SR, and generates a motion vector MV in accordance with the position of the specified macro block MB. Then, the motion prediction and compensation circuit 39 generates predicted image data based on the generated motion vector MV. The motion prediction and compensation circuit 39 outputs the selected motion vector MV to the reversible encoding circuit 27 and outputs the generated predicted image data PI to the computation circuit 24.

Figure 4:
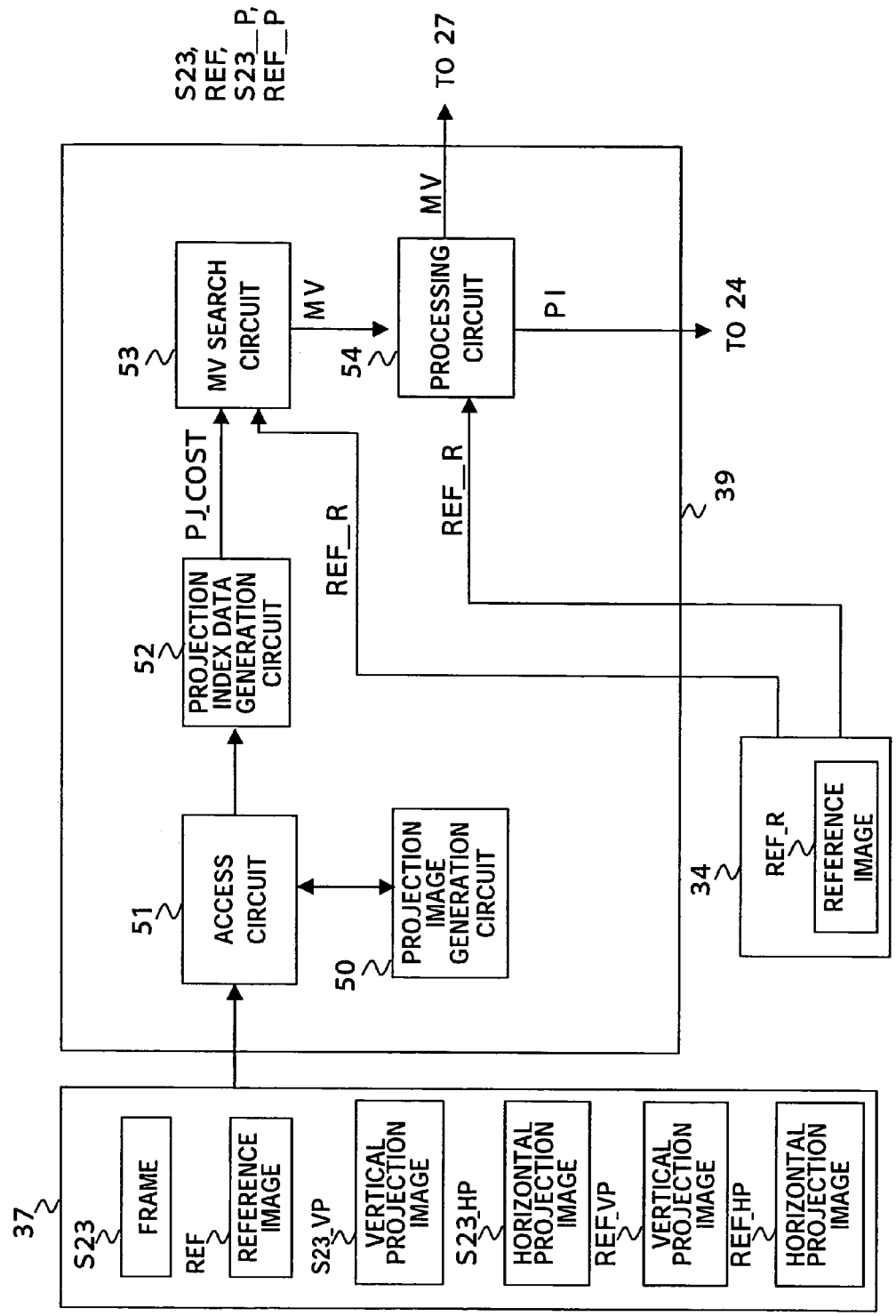
FIG. 4 is a view of the configuration of the motion prediction and compensation circuit shown in FIG. 2.

FIG. 4 is a view for explaining the configuration of the motion prediction and compensation circuit 39 shown in FIG. 2. As shown in FIG. 4, the motion prediction and compensation circuit 39 has for example a projection image generation circuit 50, an access circuit 51, a projection index data generation circuit 52, an MV search circuit 53, and a processing circuit 54. In the present embodiment, in the frame memory 37, as shown in FIG. 5(A), FIG. 6(A), FIG. 7(A), and FIG. 11(A), for any macro block MB of the frame data S23 and the reference image data REF, the pixel data belonging to the same row (j) among 16×16 pixel data pix composing a macro block MB are stored at continuous addresses, while the pixel data belonging to the same column (i) are stored at noncontinuous addresses.

Figure 5B:
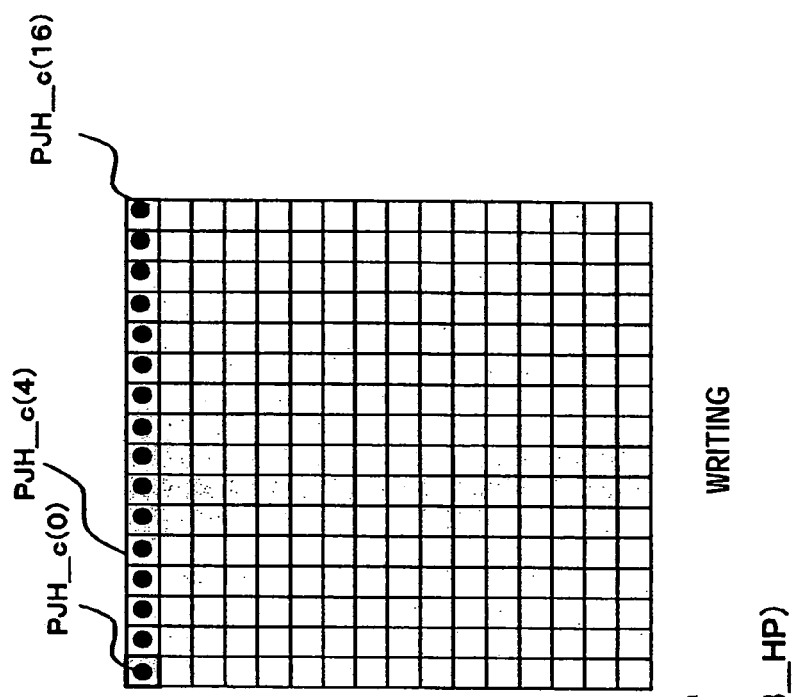
FIG. 5 is a view for explaining memory addresses of frame data and horizontal projection image data corresponding to that stored in a frame memory 37 shown in FIG. 2.
Figure 5A:
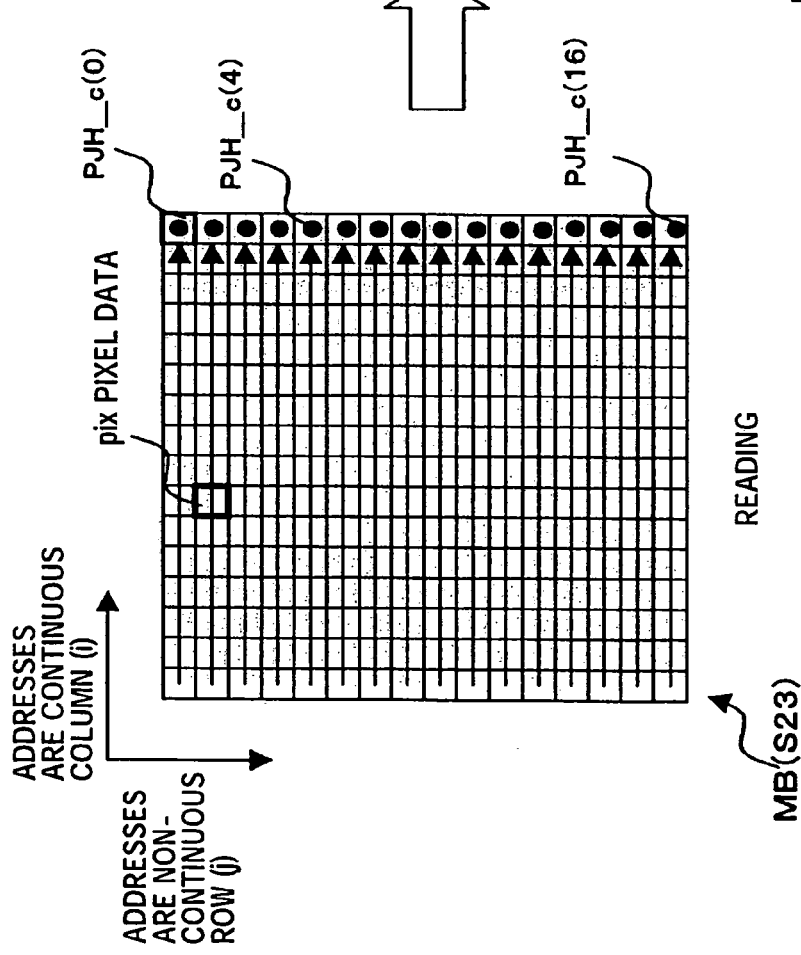

The access circuit 51 sequentially reads the 16 pixel data pix belonging to the same row (j) and stored at continuous addresses in the frame memory 37 (having the same pixel position in the vertical direction) for each row (j) of each of macro blocks MB composing the frame data S23 as shown in FIG. 5(A) and outputs the same to the projection image generation circuit 50. The projection image generation circuit 50 cumulatively adds the 16 pixel data pix read by the access circuit 51 for each row (j) to generate horizontal projection image data PJH_c(0) to (16) (the first horizontal projection image data of the present invention). Then, the access circuit 51 sequentially writes the horizontal projection image data PJH_c(0) to (16) generated by the projection image generation circuit 50 to continuous addresses in the frame memory 37 as shown in FIG. 5(B). By this, 1 macro block MB's worth of the horizontal projection image data of the frame data S23 is written into the frame memory 37. Namely, in the present embodiment, the rows and the columns of the horizontal projection image data PJH_c(0) to (16) are switched and written into the frame memory 37. For this reason, the horizontal projection image data PJH_c(0) to (16) can be written to continuous addresses in the frame memory 37. The access circuit 51 and the projection image generation circuit 50 perform the above operation for all macro blocks MB in the frame data S23 and write the horizontal projection image data S23_HP corresponding to the frame data S23 into the frame memory 37.

Figure 6B:
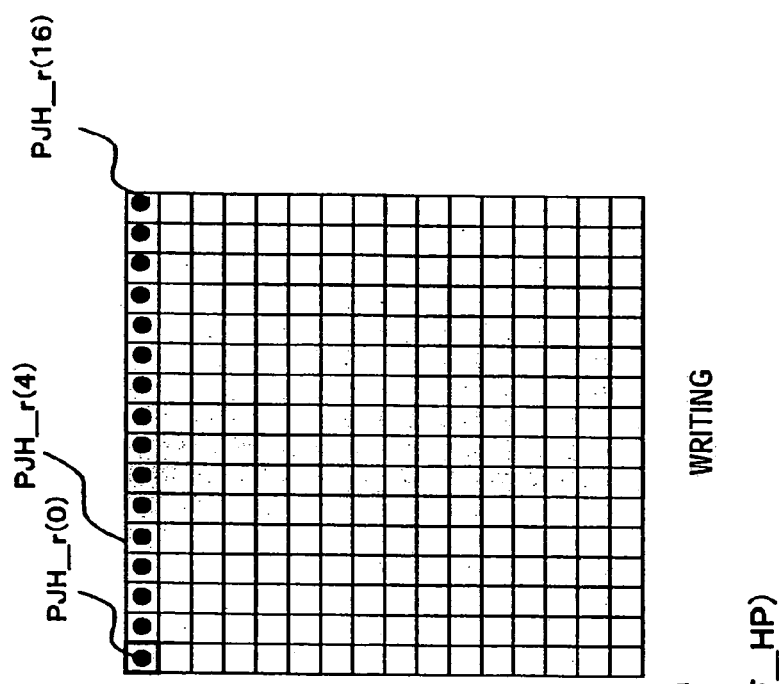
FIG. 6 is a view for explaining memory addresses of reference image data and horizontal projection image data corresponding to that stored in the frame memory 37 shown in FIG. 2.
Figure 6A:
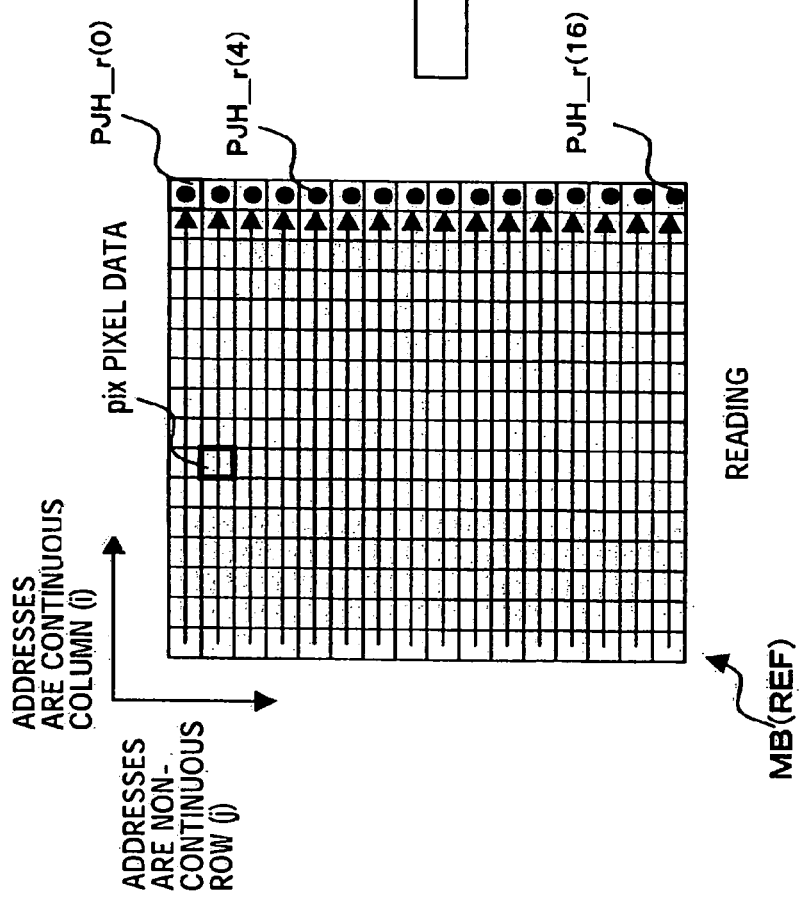

The access circuit 51 sequentially reads 16 pixel data pix belonging to the same row (j) and stored at continuous addresses in the frame memory 37 (having the same pixel position in the vertical direction) for each row (j) of each of the macro blocks MB composing the reference image data REF as shown in FIG. 6(A) and outputs the same to the projection image generation circuit 50. The projection image generation circuit 50 cumulatively adds the 16 pixel data pix read by the access circuit 51 for each of the rows (j) and generates the horizontal projection image data PJH_r(0) to (16) (the second horizontal projection image data of the present invention). Then, the access circuit 51 sequentially writes the horizontal projection image data PJH_r(0) to (16) generated by the projection image generation circuit 50 to continuous addresses in the frame memory 37 as shown in FIG. 6(B). By this, 1 macro block MB's worth of the horizontal projection image data of the reference image data REF is written into the frame memory 37. Namely, in the present embodiment, the rows and the columns of the horizontal projection image data PJH_r(0) to (16) are switched and written into the frame memory 37. For this reason, the horizontal projection image data PJH_r(0) to (16) can be written to continuous addresses in the frame memory 37. The access circuit 51 and the projection image generation circuit 50 perform the above operation for all macro blocks MB in the reference image data REF and write the horizontal projection image data REF_HP corresponding to the reference image data REF into the frame memory 37.

Figure 7B:
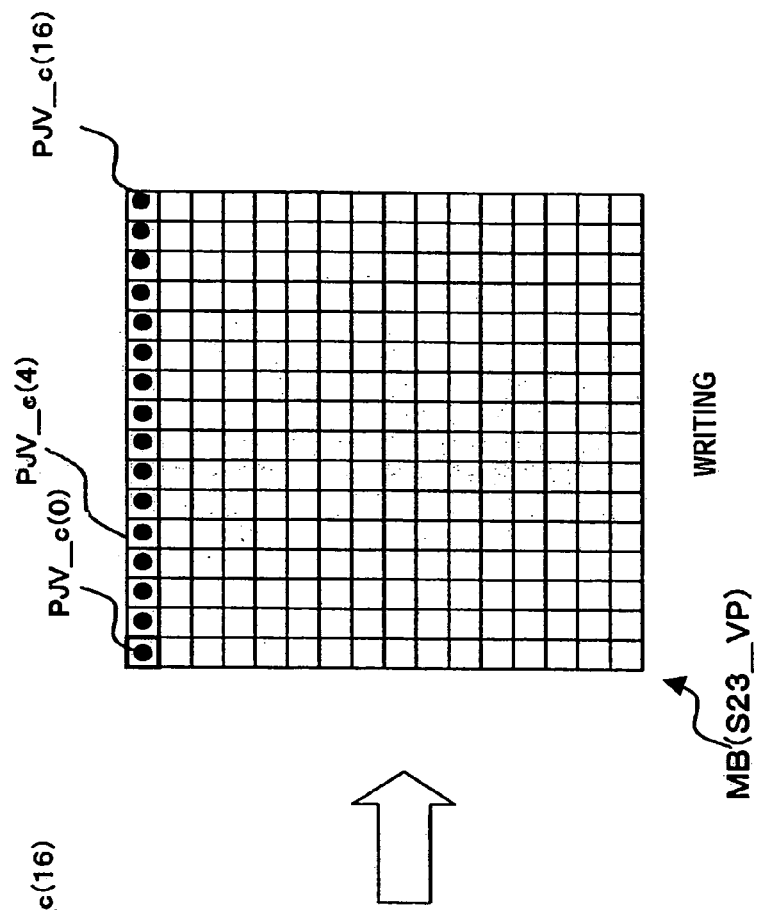
FIG. 7 is a view for explaining memory addresses of frame data and vertical projection image data corresponding to that stored in the frame memory 37 shown in FIG. 2.
Figure 7A:
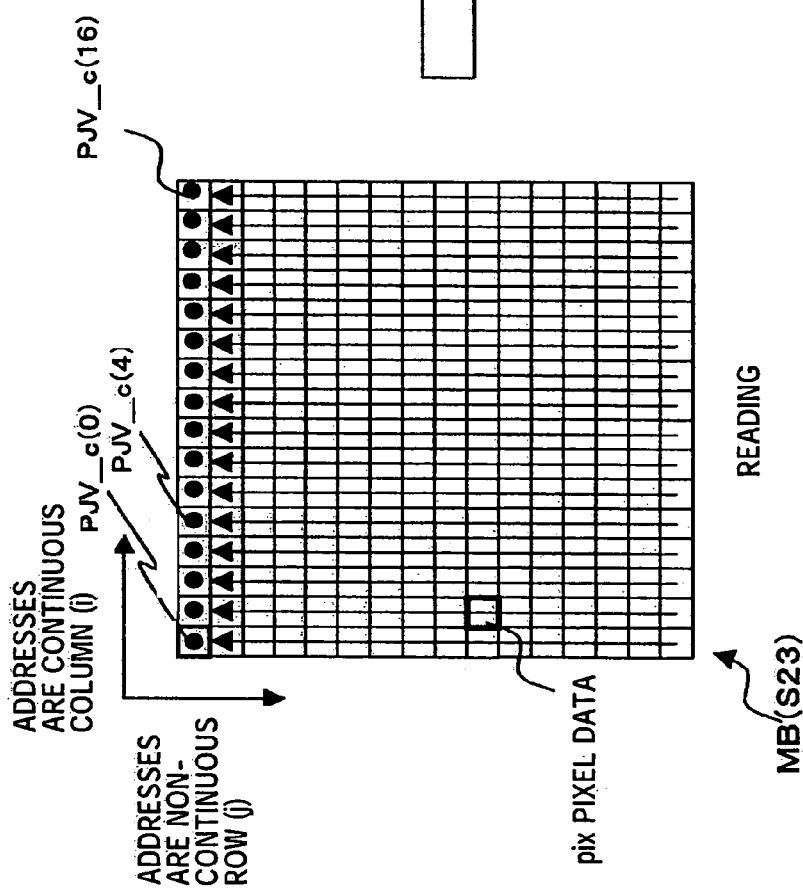

The access circuit 51 sequentially reads 16 pixel data pix belonging to the same column (i) and stored at noncontinuous addresses in the frame memory 37 (the pixel positions in the horizontal direction are the same) for each column (i) of each of the macro blocks MB composing the frame data S23 as shown in FIG. 7(A) and outputs the same to the projection image generation circuit 50. The projection image generation circuit 50 cumulatively adds the above 16 pixel data pix read by the access circuit 51 for each of the columns (i) to generate the vertical projection image data PJV_c(0) to (16) (the first vertical projection image data of the present invention). Then, the access circuit 51 sequentially writes the vertical projection image data PJV_c(0) to (16) generated by the projection image generation circuit 50 to continuous addresses in the frame memory 37 as shown in FIG. 7(B). By this, 1 macro block MB's worth of the vertical projection image data of the frame data S23 is written into the frame memory 37. The access circuit 51 and the projection image generation circuit 50 perform the above operation for all macro blocks MB in the frame data S23 and write the vertical projection image data S23_VP corresponding to the frame data S23 into the frame memory 37.

Figure 8A:
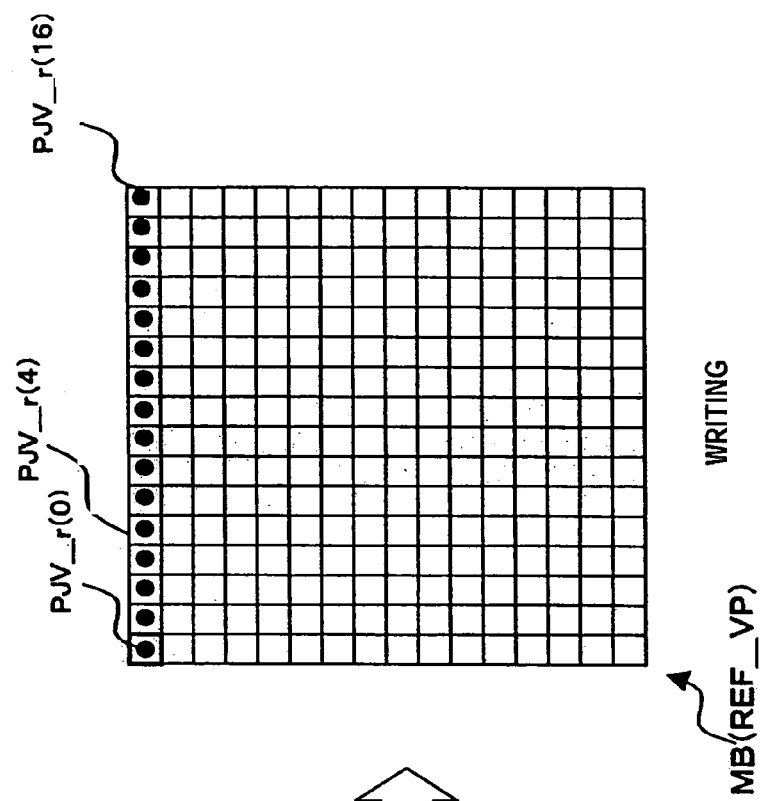
FIG. 8 is a view for explaining memory addresses of the reference image data and vertical projection image data corresponding to that stored in the frame memory 37 shown in FIG. 2.

The access circuit 51 sequentially reads 16 pixel data pix belonging to the same column (i) and stored at noncontinuous addresses in the frame memory 37 for each column (i) of each of the macro blocks MB composing the reference image data REF as shown in FIG. 8(A) and outputs the same to the projection image generation circuit 50. The projection image generation circuit 50 cumulatively adds the above 16 pixel data pix read by the access circuit 51 for each of the columns (i) to generate the vertical projection image data PJV_r(0) to (16) (the second vertical projection image data of the present invention). Then, the access circuit 51 sequentially writes the vertical projection image data PJV_r(0) to (16) generated by the projection image generation circuit 50 to continuous addresses in the frame memory 37. By this, 1 macro block MB's worth of the vertical projection image data of the reference image data REF is written into the frame memory 37. The access circuit 51 and the projection image generation circuit 50 perform the above operation for all macro blocks MB in the reference image data REF and write the vertical projection image data REF_HP corresponding to the reference image data REF into the frame memory 37.

The access circuit 51 reads the horizontal projection image data S23_HP of the macro block MB for processing from the frame memory 37 and outputs the same to the projection index data generation circuit 52. Further, the access circuit 51 reads the horizontal projection image data REF_HP of the macro blocks MB in the search range in the reference image data REF from the frame memory 37 and outputs the same to the projection index data generation circuit 52. Further, the access circuit 51 reads the vertical projection image data S23_VP of the macro block MB for processing from the frame memory 37 and outputs the same to the projection index data generation circuit 52. Further, the access circuit 51 reads the vertical projection image data REF_VP of the macro blocks MB in the search range in the reference image data REF from the frame memory 37 and outputs the same to the projection index data generation circuit 52. In the present embodiment, as mentioned above, each of the horizontal projection image data S23_HP and REF_HP and the vertical projection image data S23_VP and REF_VP of each macro block MB are stored at continuous addresses in the frame memory 37, therefore they can be read in a short time by the pipeline processing.

The projection index data generation circuit 52 generates the difference (the second difference of the present invention) between the horizontal projection image data S23_HP and the horizontal projection image data REF_HP read from the continuous addresses in the frame memory 37 by the access circuit 51 for each macro block MB for each corresponding pixel position and calculates the horizontal projection index data PJH_COST (the second index data of the present invention) indicating the sum of the differences. In the present embodiment, the operation of reading the macro block MB of the horizontal projection image data REF_HP from the frame memory 37 by the access circuit 51, the operation of reading the horizontal projection image data REF_HP from the frame memory 37 by the access circuit 51, and the operation of calculating the difference of them by projection index data generation circuit 52 are executed by pipeline processing based on a SIMD (Single Instruction Multi Datastream) command. At this time, the horizontal projection image data S23_HP and REF_HP are stored at continuous addresses in the frame memory 37, therefore they can be read in a shorter time than in the conventional case, and the difference can be calculated in a short time by pipeline processing.

Further, the projection index data generation circuit 52 generates the difference (the first difference of the present invention) between the vertical projection image data REF_VP and another vertical projection image data REF_VP read from continuous addresses in the frame memory 37 by the access circuit 51 for each macro block MB for each corresponding pixel position and calculates the vertical projection index data PJV_COST (the first index data of the present invention) indicating the sum of the differences. In the present embodiment, the operation of reading the macro block MB of the vertical projection image data S23_VP from the frame memory 37 by the access circuit 51, the operation of reading the vertical projection image data REF_VP from the frame memory 37 by the access circuit 51, and the operation of calculating their difference by the projection index data generation circuit 52 are executed by pipeline processing based on a SIMD command. At this time, the vertical projection image data S23_VP and REF_VP are stored at continuous addresses in the frame memory 37, therefore they can be read in a short time, and the difference can be calculated in a short time by pipeline processing.

Then, the projection index data generation circuit 52 generates the projection index data PJ_COST indicating the sum of the calculated horizontal projection index data PJH_COST and vertical projection index data PJV_COST. The projection index data generation circuit 52 calculates the projection index data PJ_COST for the plurality of second macro blocks MB in the search range SR of the reference image data REF and outputs this to the MV search circuit 53.

The MV search circuit 53 specifies the minimum data among the projection index data PJ_COST from all second macro blocks MB in the reference image data REF and generates the motion vector MV_P in accordance with the position of the second macro block MB corresponding to the specified index data PJ_COST. Then, the MV search circuit 53 determines the search range in the recomposed reference image-data REF read from the frame memory 34 based on the motion vector MV_P generated based on the projection image data, specifies the macro block MB having the minimum sum of differences in the pixel data unit from the macro block MB for processing in the determined search range, and generates the motion vector MV in accordance with the position of the specified macro block MB. The MV search circuit 53 outputs the motion vector MV to the processing circuit 54.

The processing circuit 54 generates predicted image data PI based on the motion vector MV input from the MV search circuit 53 and the reference image data REF_P read from the frame memory 34. The processing circuit 54 outputs the motion vector MV to the reversible encoding circuit 27 and outputs the generated predicted image data PI to the computation circuit 24.

Figure 9:
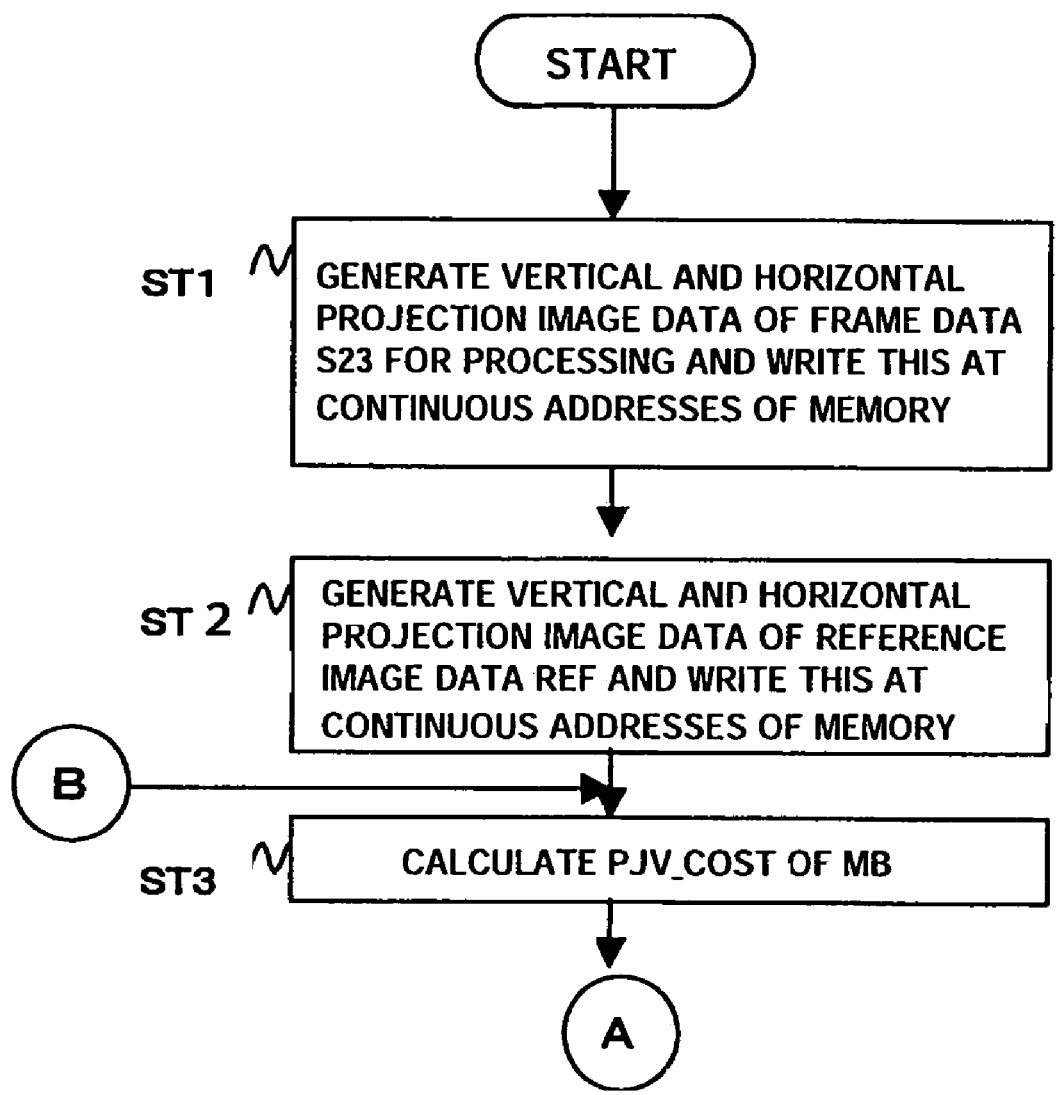
FIG. 9 is a flow chart for explaining an example of the operation of the motion prediction and compensation circuit shown in FIG. 4.
Figure 10:
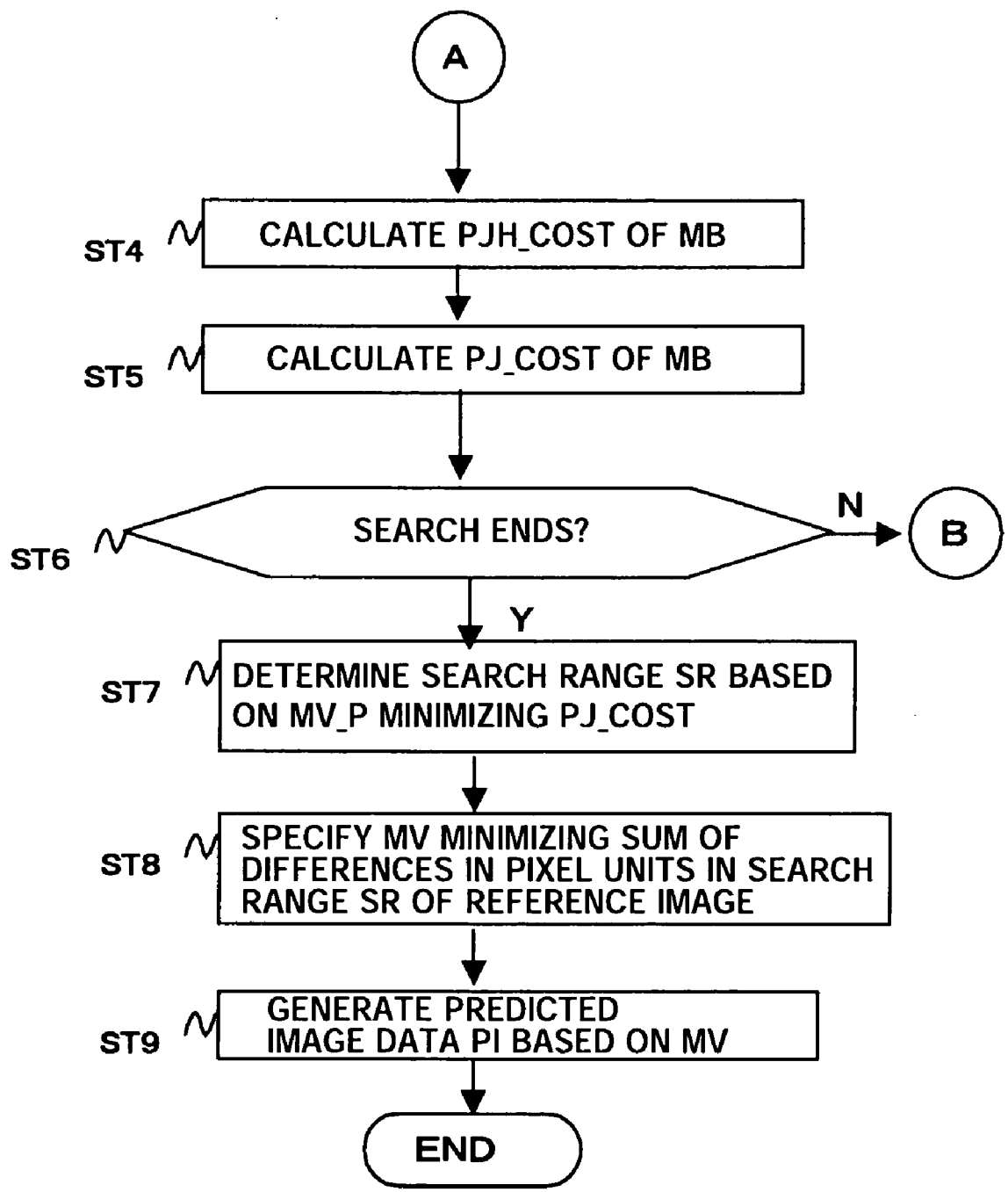
FIG. 10 is a flow chart continued from FIG. 9 for explaining an example of the operation of the motion prediction and compensation circuit shown in FIG. 4.

Below, an explanation will be given of an example of the operation of the motion prediction and compensation circuit 39 shown in FIG. 4. FIG. 9 and FIG. 10 are flow charts for explaining an example of the operation of the motion prediction and compensation circuit 39 shown in FIG. 4.

Step ST1

The projection image generation circuit 50 generates the horizontal projection image data S23_HP in units of macro blocks MB of the frame data S23 as mentioned above and writes this at continuous addresses in the frame memory 37 as shown in FIG. 5(B). Further, the projection image generation circuit 50 generates the vertical projection image data S23_VP in units of macro blocks MB of the frame data S23 as mentioned above and writes this at continuous addresses in the frame memory 37 as shown in FIG. 7(B).

Step ST2

Figure 8B:
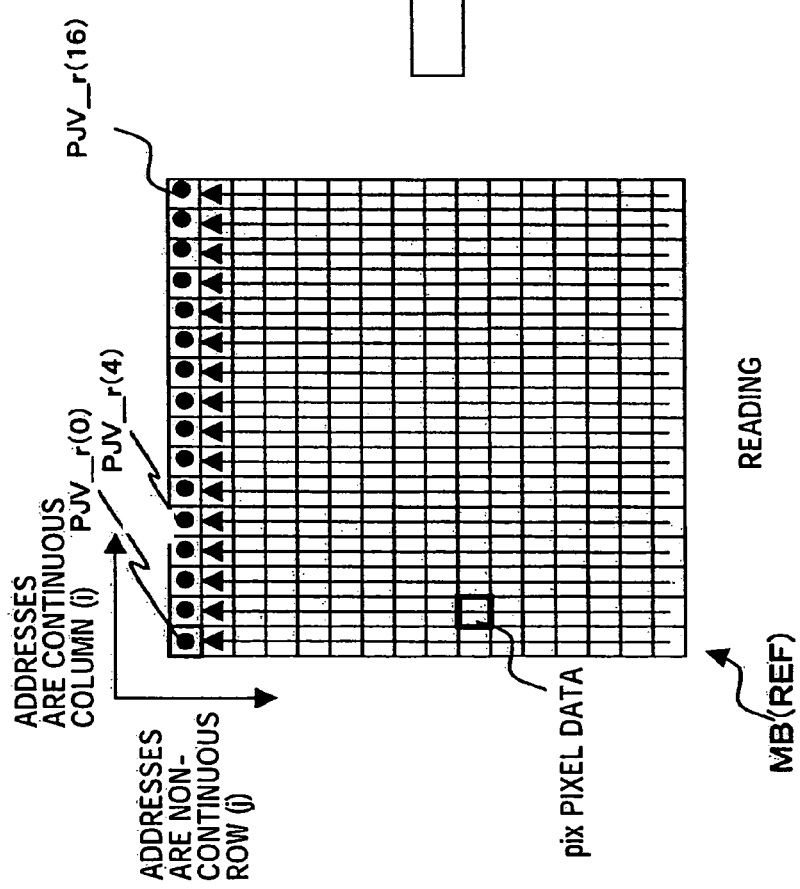

The projection image generation circuit 50 generates the horizontal projection image data REF_HP in units of macro blocks MB of the reference image data REF and writes this at continuous addresses in the frame memory 37 as shown in FIG. 6(B). Further, the projection image generation circuit 50 generates the vertical projection image data REF_VP in units of macro blocks MB of the reference image data REF as mentioned above and writes this to the continuous addresses in the frame memory 37 as shown in FIG. 8(B).

Step ST3

The projection index data generation circuit 52 generates the difference between the horizontal projection image data REF_HP and another horizontal projection image data REF_HP read from continuous addresses in the frame memory 37 by the access circuit 51 for each macro block MB for each corresponding pixel position and calculates the horizontal projection index data PJH_COST indicating the sum of the differences.

Step ST4

The projection index data generation circuit 52 generates the difference between the vertical projection image data REF_VP and another vertical projection image data REF_VP read from continuous addresses in the frame memory 37 for each macro block MB by the access circuit 51 for each corresponding pixel position and calculates the vertical projection index data PJV_COST indicating the sum of the differences.

Step ST5

The projection index data generation circuit 52 generates the projection index data PJ_COST indicating the sum of the calculated horizontal projection index data PJH_COST and vertical projection index data PJV_COST.

Step ST6

The projection index data generation circuit 52 decides whether or not the projection index data PJ_COST was calculated for all of the plurality of second macro blocks MB in the search range SR of the reference image data REF and, when deciding yes, proceeds to step ST7, while when deciding no, returns to step ST3.

Step ST7

The MV search circuit 53 specifies the minimum data among the projection index data PJ_COST from all second macro blocks MB in the reference image data REF and generates a motion vector MV_P in accordance with the position of the second macro block MB corresponding to the specified index data PJ_COST. Then, the MV search circuit 53 determines the search range in the recomposed reference image data REF_R read from the frame memory 34 based on the motion vector MV_P generated based on the projection image data.

Step ST8

The MV search circuit 53 specifies the macro block MB having the minimum sum of differences in pixel data units from the macro blocks MB for processing in the search range determined in step ST7 and specifies the motion vector MV in accordance with the position of the specified macro block MB. The MV search circuit 53 outputs the motion vector MV to the processing circuit 54.

Step ST9

The processing circuit 54 generates predicted image data PI based on the motion vector MV input from the MV search circuit 53 in step ST8 and the reference image data REF_P read from the frame memory 34. The processing circuit 54 outputs the motion vector MV to the reversible encoding circuit 27 and outputs the generated predicted image data PI to the computation circuit 24.

Below, an explanation will be given of the overall operation of the encoding device 2 shown in FIG. 2. When the original image signal S10 is input, the original image signal S10 is converted to the digital frame data S22 in the A/D conversion circuit 22. Next, in accordance with the GOP structure of the image compression information to be output, the pictures in the frame data S22 are rearranged in the picture rearrangement circuit 23, and the frame data S23 obtained by this is output to the computation circuit 24 and the rate control circuit 32. Further, the frame data S23 is written into the frame memory 37. Next, the computation circuit 24 detects the difference between the frame data S23 from the picture rearrangement circuit 23 and the predicted image data PI from the motion prediction and compensation circuit 39 and outputs the image data S24 indicating the difference thereof to the orthogonal transform circuit 25.

Next, the orthogonal transform circuit 25 applies an orthogonal transform such as a discrete cosine transform or Karhunen-Loeve transform to the image data S24 to generate the image data S25 and outputs this to the quantization circuit 26. Next, the quantization circuit 26 quantizes the image data S25 and outputs the quantized conversion coefficient S26 to the reversible encoding circuit 27 and the inverse quantization circuit 29. Next, the reversible transform circuit 27 applies reversible encoding such as variable length encoding or arithmetic encoding to the transform coefficient S26 to generate the image data and stores this in the buffer 28. Further, the rate control circuit 32 controls the quantization rate in the quantization circuit 26 based on the frame data S23 and the image data from the buffer 28.

Further, the inverse quantization circuit 29 inversely quantizes the transform coefficient S26 input from the quantization circuit 26 and outputs the inverse quantized transform coefficient to the inverse orthogonal transform circuit 30. The inverse orthogonal transform circuit 30 applies an inverse transform to the inverse quantized transform coefficient input from the inverse quantization circuit 29 and outputs the data to the deblock filter 38.

The deblock filter 38 outputs the image data eliminating the block distortion of the transform coefficient from the data input from the inverse orthogonal transform circuit 30 and write the data into the frame memory 34. Then, the motion prediction and compensation circuit 39 performs the motion prediction and compensation processing explained by using FIG. 3 to FIG. 10 based on the frame data S23 and the reference image data REF and generates the motion vector MV and the predicted image data PI. The motion prediction and compensation circuit 39 outputs the motion vector MV to the reversible encoding circuit 27 and outputs the predicted image data PI to the computation circuit 24.

As explained above, in the encoding device 2, the access circuit 51 of the motion prediction and compensation circuit 39 writes the horizontal projection image data S23_HP and REF_HP and the vertical projection image data S23_VP and REF_VP generated by the projection image generation circuit 50 at continuous addresses in the frame memory 37 in units of macro blocks MB as shown in FIG. 5 to FIG. 8, whereby they can be read in a short time. For this reason, the projection index data PJ_COST can be generated in a short time by pipeline processing. Due to this, the processing time of the motion prediction and compensation circuit 39 can be shortened.

Second Embodiment

Figure 11:
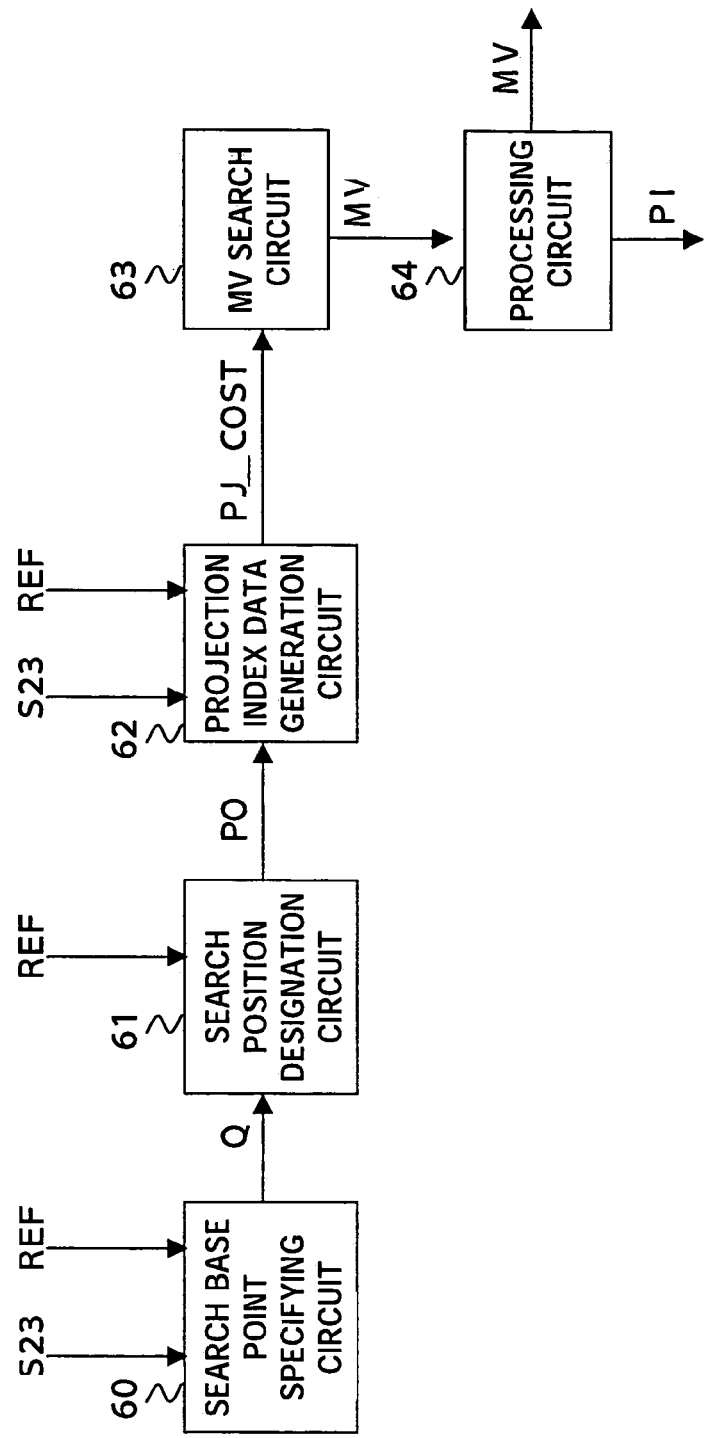
FIG. 11 is a view of the configuration of the motion prediction and compensation circuit shown in FIG. 2 of the encoding device according to a second embodiment of the present invention.

The present embodiment corresponds to the fourth to sixth aspects of the invention. An encoding device 2a of the present embodiment has the same configuration as that of the encoding device 2 of the first embodiment except for the motion prediction and compensation circuit 39 shown in FIG. 2. FIG. 11 is a view of the configuration of a motion prediction and compensation circuit 39a of the present embodiment. As shown in FIG. 11, the motion prediction and compensation circuit 39a has for example a search base point specifying circuit 60, a search position designation circuit 61, a projection index data generation circuit 62, an MV search circuit 63, and a processing circuit 64. The projection index data generation circuit 62 corresponds to the detection circuit of the fourth and fifth aspects of the invention, the MV search circuit 63 corresponds to the motion vector generation circuit of the fourth and fifth aspects of the invention, and the search position designation circuit 61 corresponds to the designation circuit of the fourth and fifth aspects of the invention. Further, the search base point specifying circuit 60 corresponds to the search base point specifying circuit.

The search base point specifying circuit 60 calculates for example the motion vector by a smaller computation amount than that of the search of the motion vector MV by the projection index data generation circuit 62 and the MV search circuit 63 based on the motion vector obtained by the search of the first stage of the hierarchical search or the predicted motion vector etc. calculated from the motion vector already obtained for the macro blocks MB on the periphery of the first macro block MB for processing and specifies the search base point Q prescribed by the motion vector.

Figure 12:
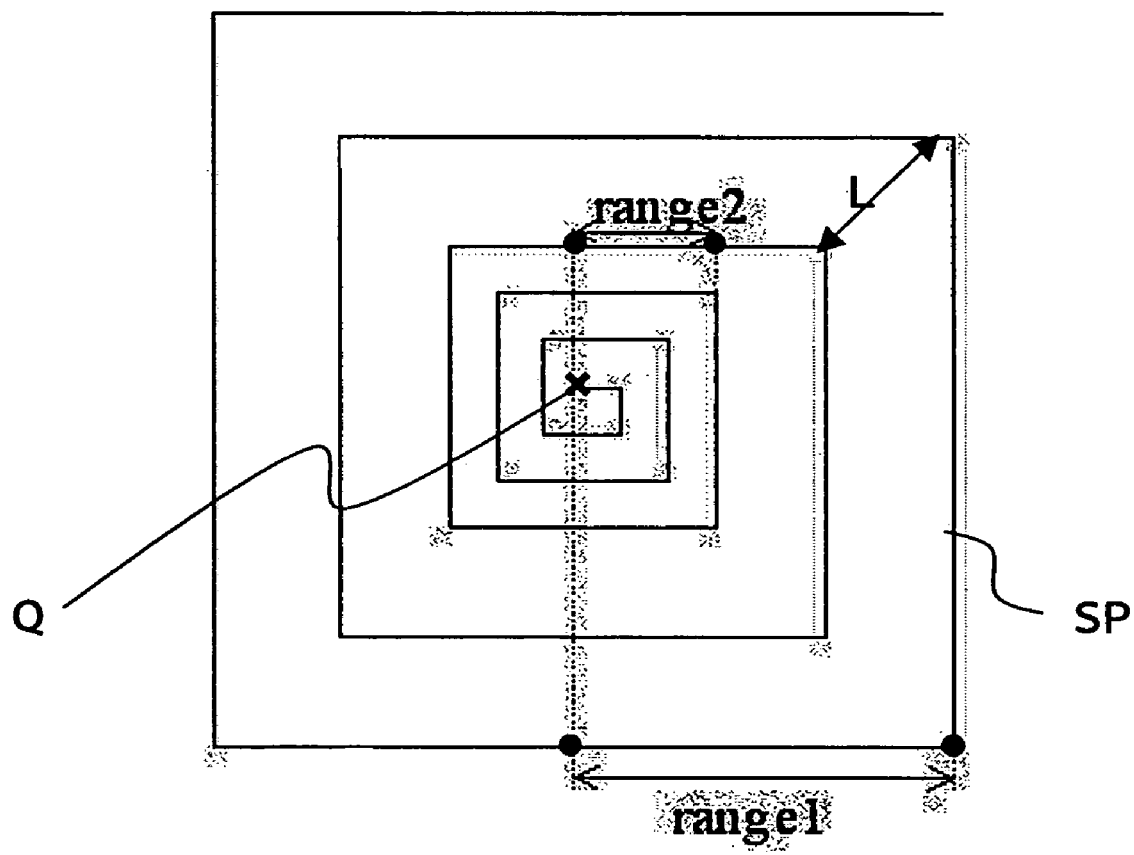
FIG. 12 is a flow chart for explaining a pattern of designation of search positions by a search position designation circuit shown in FIG. 11.

The search position designation circuit 61 sequentially designates the search position by a predetermined distance interval from the search base point Q toward the outside along a spiral pattern SP using the search base point Q of the search range in the reference image data REF read from the frame memory 34 as the start point as shown in FIG. 12. The search position designation circuit 61 designates the search position by the first distance interval (a "range 2" in FIG. 12, for example the pixel data interval of 1 pixel unit) when the designated search position is within a predetermined distance L from the search base point Q and designates the search position by the second distance interval longer than the first distance interval (a "range 1" in FIG. 12, for example the pixel data interval of 2 pixels' unit) when it exceeds the predetermined distance L. The search position designation circuit 61 outputs the search position data PO indicating the determined search position to the projection index-data generation circuit 62.

The projection index data generation circuit 62 calculates the projection index data PJ_COST indicating the difference by projection image between the macro block MB located at the search position indicated by the search position data PO in the reference image data REF and the macro block MB for processing in the frame data S22. The MV search circuit 63 defines the motion vectors MV corresponding to a predetermined number of data from the smallest data among the projection index data PJ_COST at all search positions on the spiral pattern SP input from the projection index data generation circuit 62 as candidate motion vectors CMV. The MV search circuit 63 generates index data in accordance with the sum of differences of the pixel unit between the first macro block MB in the frame data for processing and the second macro block MB in the reference image data for each of the predetermined number of candidate motion vectors CMV, selects the motion vector minimizing the index data, and outputs this to the processing circuit 64.

The processing circuit 64 outputs the motion vector MV input from the MV search circuit 63 to the reversible encoding circuit 27 shown in FIG. 2. Further, the processing circuit 64 generates predicted image data PI based on the motion vector MV input from the MV search circuit 63 and the reference image data REF and outputs this to the computation circuit 24 shown in FIG. 2.

Figure 13:
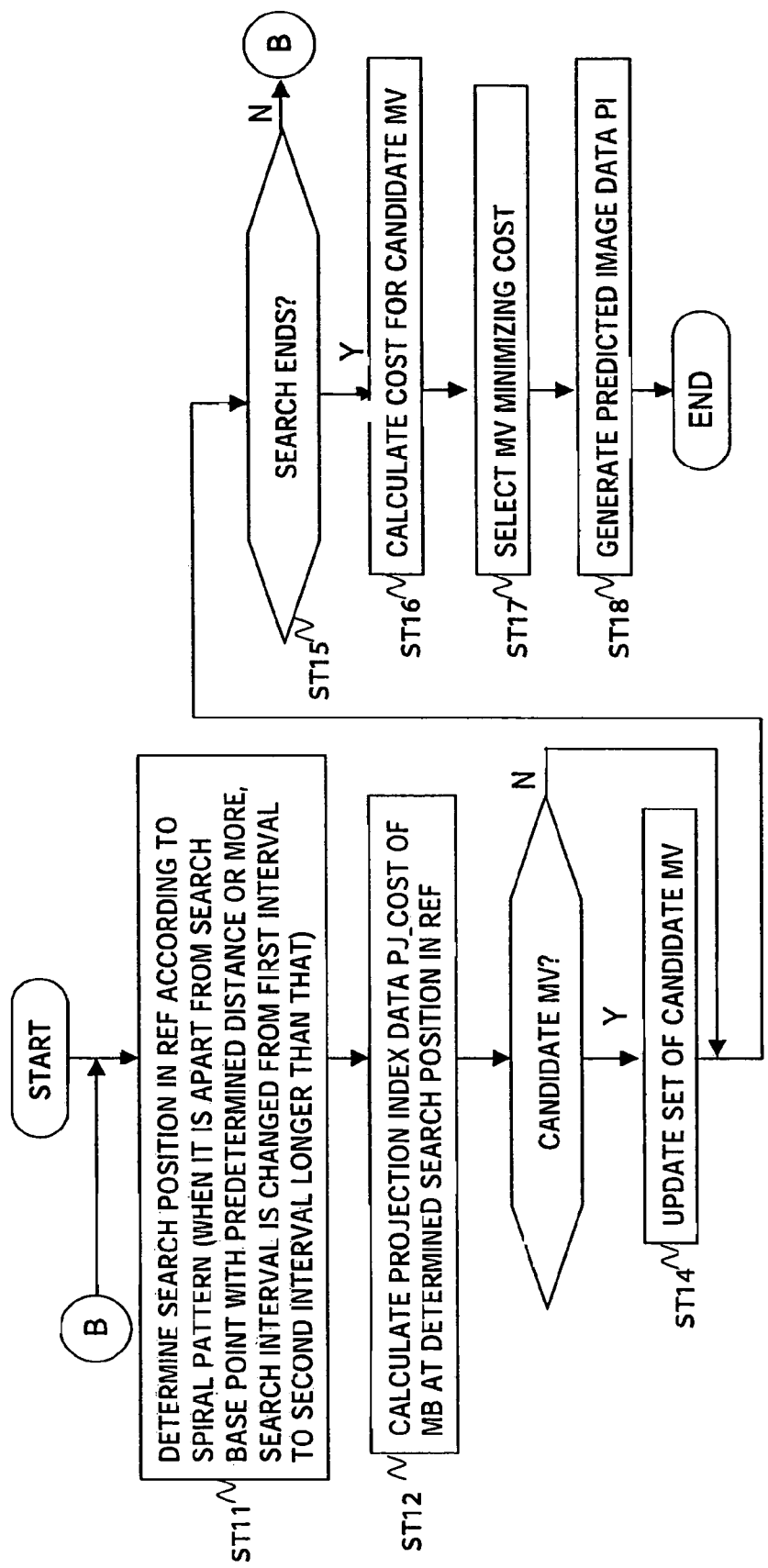
FIG. 13 is a flow chart for explaining an example of the operation of the motion prediction and compensation circuit shown in FIG. 11.

Below, an explanation will be given of an example of the operation of the motion prediction and compensation circuit 39a shown in FIG. 11. FIG. 13 is a flow chart for explaining an example of the operation of the motion prediction and compensation circuit 39a shown in FIG. 11.

Step ST11

The search position designation circuit 61 sequentially designates the search position from the search base point Q toward the outside along a spiral pattern SP by a predetermined distance interval using the search base point Q in the search range in the reference image data REF read from the frame memory 34 as the start point as shown in FIG. 12. At this time, the search position designation circuit 61 designates the search position by a first distance interval when the designated search position is within a predetermined distance L from the search base point Q, while designates the search position by a second distance interval longer than the first distance interval when it exceeds the predetermined distance L. The search position designation circuit 61 outputs the search position data PO indicating the determined search position to the projection index data generation circuit 62.

Step ST12

The projection index data generation circuit 62 calculates the projection index data PJ_COST indicating the difference by the projection image between the second macro block MB located at the search position indicated by the search position data PO in the reference image data REF and the first macro block MB for processing in the frame data S23.

Step ST13

The MV search circuit 63 decides whether or not the predetermined number of data from the smallest data among the projection index data PJ_COST at all search positions on the spiral pattern SP input from the projection index data generation circuit 62 were processed and, when deciding yes, proceeds to step ST14, while when deciding no, proceeds to step ST15.

Step ST14

The MV search circuit 63 adds the motion vector MV corresponding to the projection index data PJ_COST input in step ST13 to the set of the candidate motion vectors CMV.

Step ST15

The MV search circuit 63 decides whether or not the projection index data PJ_COST was calculated for all search positions on the spiral pattern SP and, when deciding yes, proceeds to step ST16, while when deciding no, returns to step ST11.

Step ST16

The MV search circuit 63 calculates the index data COST in accordance with the sum of differences of pixel units between the first macro block MB in the frame data for processing and the second macro block MB in the reference image data for each of the predetermined number of candidate motion vectors CMV as the element of the set finally obtained in step ST14.

Step ST17

The MV search circuit 63 selects the motion vector MV minimizing the index data COST calculated in step ST16 and outputs this to the processing circuit 64.

Step ST18

The processing circuit 64 outputs the motion vector MV input from the MV search circuit 63 in step ST17 to the reversible encoding circuit 27 shown in FIG. 2. Further, the processing circuit 64 generates predicted image data PI based on the motion vector MV input from the MV search circuit 63 and the reference image data REF and outputs this to the computation circuit 24 shown in FIG. 2.

As explained above, according to the motion prediction and compensation circuit 39a, when the search position designated by the search position designation circuit 61 is within the predetermined distance L from the search base point Q, the search position is designated by the first distance interval, while when it exceeds the predetermined distance L, the search position is designated by the second distance interval longer than the first distance interval. For this reason, the computation amount can be greatly reduced in comparison with the case where all of the search range in the reference image data REF is designated by the first distance interval. On the other hand, the motion vector MV minimizing the projection index data PJ_COST is specified with a high probability on the periphery of the search base point Q, so the correct motion vector MV can be generated.

Note that, in the second embodiment, when the motion vector MV is detected at the search position designated by the search position designation circuit 61 by the second distance interval, in the region within the predetermined distance from the search position, the motion vector can be searched for again by designating the search position by the first distance interval as well.

Third Embodiment

The present embodiment corresponds to the seventh to ninth embodiments. The encoding device of the present embodiment has basically the same configuration as that of the encoding device 2 shown in FIG. 2. Further, the motion prediction and compensation circuit 39a of the encoding device of the present invention is the same as the motion prediction and compensation circuit 39a of the second embodiment except for the following point. In the present embodiment, the configurations for generating the candidate motion vectors NV of the projection index data generation circuit 62 and the MV search circuit 63 shown in FIG. 11 correspond to the candidate motion vector calculation circuits of the seventh and eighth aspects of the invention. Further, the configuration for generating the index data COST of the MV search circuit 63 corresponds to the index data calculation circuit of the seventh and eighth aspects of the invention. Further, the configuration for specifying the motion vector MV based on the index COST of the MV search circuit 63 corresponds to the motion vector specifying circuit of the seventh and eighth aspects of the invention.

In the motion prediction and compensation circuit 39a of the present embodiment, the configurations of the search base point specifying circuit 60 and the search position designation circuit 61 shown in FIG. 11 are not particularly limited to those shown in the second embodiment. For example, it is also possible if the motion vector minimizing the index data COST indicating the sum of differences among corresponding pixel data between the frame data covered by the motion compensation and the reference image data thereof in units for example of macro blocks MB is generated. Further, the search position designation circuit 61 does not have to designate the search position along a spiral pattern as in the second embodiment. The distance intervals of the search positions can be made constant too.

Figure 14A:
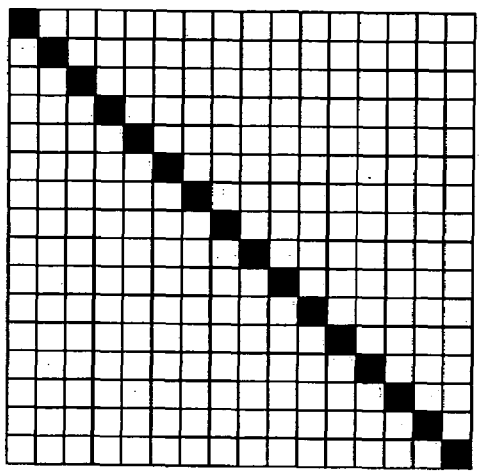
FIG. 14 is a diagram for explaining an effect of the encoding device according to a third embodiment of the present invention.
Figure 14B:
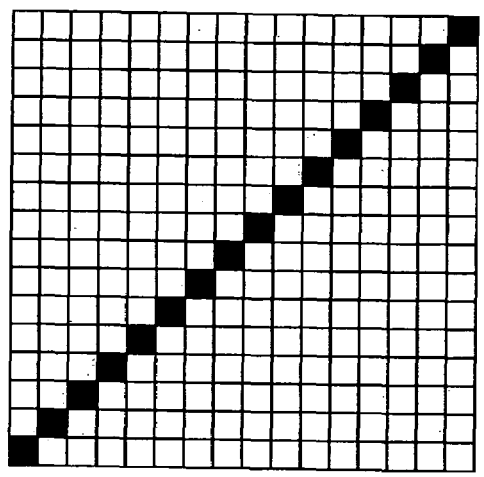

According to the present embodiment, a motion vector MV is generated by calculating the index data COST for the candidate motion vectors CMV. Therefore, even in the case where a projection image is used for generating the candidate motion vectors CMV, for example, as shown in FIGS. 14(A) and 14(B), the correct motion vector MV can be generated for macro blocks MB different in image pattern, but the same in index data PJ_COST.

Summarizing the effects of the invention, the present invention can be applied to an encoding system for encoding image data.

While the invention has been described with reference to specific embodiments chosen for purpose of illustration, it should be apparent that numerous modifications could be made thereto by those skilled in the art without departing from the basic concept and scope of the invention.

What is claimed is:

1. A data processing apparatus comprising:
   a projection image generating means for generating first horizontal projection image data and first vertical projection image data of first block data in encoded image data, and generating second horizontal projection image data and second vertical projection image data for each of a plurality of second block data in reference image data;
   a controlling means for writing the first vertical projection image data, the first horizontal projection image data, the second vertical projection image data, and the second horizontal projection image data at continuous addresses of a storing means, and reading the same from the continuous addresses of the storing means; and a searching means for specifying one of the plurality of second block data that has a minimum difference from the first block data, and generating a motion vector based on the first vertical projection image data, the first horizontal projection image data, the second vertical projection image data of the specified second block data, and the second horizontal projection image data of the specified second block data.

2. A data processing apparatus as set forth in claim 1, wherein the searching means generates a motion vector of the first block data based on a position relationship between the first block data and the specified second block data.

3. A data processing apparatus as set forth in claim 1, wherein the searching means specifies the second block data having a minimum sum of differences with the first block data for each pixel data among the second block data in a search range prescribed based on the specified second block data in the reference image data.

4. A data processing apparatus as set forth in claim 1, wherein the projection image generating means cumulatively adds pixel data at a plurality of continuous pixel positions in columns of the first block data to generate the first vertical projection image data, cumulatively adds pixel data at a plurality of continuous pixel positions in rows of the first block data to generate the first horizontal projection image data, cumulatively adds pixel data at a plurality of continuous pixel positions in columns of the second block data to generate the second vertical projection image data, and cumulatively adds pixel data at a plurality of continuous pixel positions in rows of the second block data to generate the second horizontal projection image data; and the searching means calculates a plurality of first differences between the first vertical projection image data and the second vertical projection image data for the columns of the first block data and the second block data, cumulatively adds the first differences to generate first index data, calculates a plurality of second differences between the first horizontal projection image data and the second horizontal projection image data for the rows of the first block data and the rows of the second block date, cumulatively adds the second differences to generate second index data, and specifies the second block data that minimizes a sum of the first index data and the second index data.

5. A data processing apparatus as set forth in claim 4, wherein the controlling means reads the first vertical projection image data, the first horizontal projection image data, the second vertical projection image data, and the second horizontal projection image data from the storing means;

the search means calculates the first difference and the second difference by pipeline processing.

6. An encoding device comprising:

a motion compensation circuit for generating a motion vector of block data including encoded image data, and generating predicted image data in accordance with the motion vector; and an encoding circuit for encoding a difference between the encoded image data and the predicted image data, wherein the motion compensation circuit further comprises:

a projection image generating means for generating first horizontal projection image data and first vertical projection image data of first block data in the encoded image data, and generating second horizontal projection image data and second vertical projection image data for each of a plurality of second block data in reference image data;

a controlling means for writing the first vertical projection image data, the first horizontal projection image data, the second vertical projection image data, and the second horizontal projection image data at continuous addresses of a storing means, and reading the same from the continuous addresses of the storing means;

a motion vector generation circuit for specifying second block data having a minimum difference from the first block data among the plurality of second block data, and generating a motion vector based on the first vertical projection image data, the first horizontal projection image data, the second vertical projection image data of the specified second block data, and the second horizontal projection image data of the specified second block data; and a processing means for generating the predicted image data based on the motion vector generated by the motion vector generating means.

7. A data processing method comprising:

generating first horizontal projection image data and first vertical projection image data of first block data in encoded image data, and generating second horizontal projection image data and second vertical projection image data for each of a plurality of second block data in reference image data;

writing the first vertical projection image data, the first horizontal projection image data, the second vertical projection image data, and the second horizontal projection image data into a storing means at continuous addresses of the storing means;

reading the first vertical projection image data, the first horizontal projection image data, the second vertical projection image data, and the second horizontal projection image data from the continuous addresses of the storing means; and specifying one of the plurality of second block data that has a minimum difference from the first block data, and generating a motion vector based on the first vertical projection image data, the first horizontal projection image data, the second vertical projection image data of the specified second block data, and the second horizontal projection image data of the specified second block data.

8. A data processing apparatus comprising:

a candidate motion vector specifying circuit for detecting differences between projection image data of first block data in encoded image data and projection image data of a plurality of second block data in reference image data, and specifying a plurality of candidate motion vectors corresponding to minimum differences among the detected differences;

an index data calculation circuit for calculating index data for the candidate motion vectors, the index data indicating sums of the differences among corresponding pixel data between the first block data and the second block data; and a motion vector specifying circuit for specifying a motion vector of the first block data from the candidate motion vectors, the motion vector being one of the candidate motion vectors corresponding to a minimum index data among the calculated index data.

9. An encoding device comprising:

a motion compensation circuit for generating a motion vector of block data of encoded image data and generating predicted image data in accordance with the motion vector; and an encoding circuit for encoding the difference between the encoded image data and the predicted image data generated by the motion compensation circuit; wherein the motion compensation circuit further comprises:

a candidate motion vector specifying circuit for detecting differences between projection image data of a first block data in the encoded image data and projection image data of a plurality of second block data in reference image data, and specifying a plurality of candidate motion vectors corresponding to minimum differences among the detected differences;

an index data calculation circuit for calculating index data for the candidate motion vectors, the index data indicating sums of differences among corresponding pixel data between the first block data and the second block data; and a motion vector specifying circuit for specifying a motion vector of the first block data from the candidate motion vectors, the motion vector being one of the candidate motion vectors corresponding to a minimum index data among the calculated index data.

10. A data processing method comprising:

detecting differences between projection image data of first block data in encoded image data and projection image data of a plurality of second block data in reference image data, and specifying a plurality of candidate motion vectors corresponding to minimum differences among the detected plurality of differences;

calculating index data for the candidate motion vectors, the index data indicating sums of the differences among corresponding pixel data between the first block data and the second block data; and specifying a motion vector of the first block data from the candidate motion vectors, the motion vector being one of the candidate motion vectors that has a minimum index data among the calculated index data.

* * * * *